United States Patent [19]
Franz

[11] 3,853,530
[45] Dec. 10, 1974

[54] REGULATING PLANTS WITH N-PHOSPHONOMETHYLGLYCINE AND DERIVATIVES THEREOF

[75] Inventor: John E. Franz, Crestwood, Mo.

[73] Assignee: Monsanto Company, St. Louis, Mo.

[22] Filed: Feb. 3, 1972

[21] Appl. No.: 223,351

Related U.S. Application Data

[63] Continuation-in-part of Ser. No. 123,057, March 10, 1971, abandoned.

[52] U.S. Cl. .................................... 71/76, 71/86
[51] Int. Cl. .............................. A01n, A01n 9/36
[58] Field of Search .................. 71/86, 87, 88, 76

[56] References Cited
UNITED STATES PATENTS

| | | | |
|---|---|---|---|
| 3,160,632 | 12/1964 | Fontoy et al. | 260/268 |
| 3,455,675 | 7/1969 | Inani | 71/86 |
| 3,556,762 | 1/1971 | Hamm | 71/86 |
| 3,726,947 | 4/1973 | Moser | 71/86 |
| 3,728,381 | 4/1973 | Randall | 71/86 |

*Primary Examiner*—James O. Thomas, Jr.
*Attorney, Agent, or Firm*—Arnold H. Cole; Donald W. Peterson; Neal E. Willis

[57] ABSTRACT

N-phosphonomethylglycine and derivatives thereof useful to regulate the natural growth or development of plants.

35 Claims, No Drawings

REGULATING PLANTS WITH N-PHOSPHONOMETHYLGLYCINE AND DERIVATIVES THEREOF

This application is a continuation-in-part of copending application Ser. No. 123,057 filed Mar. 10, 1971, now abandoned.

This invention relates to a method for regulating the natural growth or development of plants by means of chemical treatment. More particularly, this invention is concerned with a method wherein plants are treated with a chemical substance which alters their natural growth or development to enhance various agricultural or horticultural features of the plants. As employed herein, the term "natural growth or development" designates the normal life cycle of the plant in accordance with its genetics and its environment, in the absence of artificial, external influences.

It is to be understood, at the outset, that the regulation of natural growth and development hereinafter discussed does not include killing or herbicidal action. Although phytotoxic or lethal amounts of the materials disclosed herein might be employed to obtain a total inhibition of certain plants, it is contemplated here to employ only such amounts of said materials as will serve to regulate the natural growth and development. As may be expected, and as long understood by those skilled in the art, such effective plant regulating amounts will vary, not only with the particular material selected for treatment, but also with the regulatory effect to be achieved, the species of plant being treated and its stage of development, and whether a permanent or transient regulating effect is sought. Other factors which may bear upon the determination of an appropriate plant regulating amount include the plant growth medium, the manner in which the treatment is to be applied, weather conditions such as temperature or rainfall, and the like.

In accordance with the instant invention it has been found that desirable regulation of natural plant growth or development is achieved by application of a selected material to seeds, seedlings before or after emergence, roots, stems, leaves, flowers, fruit or other plant parts. Such application may be made directly to one or more of these plant parts, or application may be made indirectly as by treatment of the plant growth medium.

The chemical substances employed in practicing the method of this invention consist of compounds illustrated by the formula

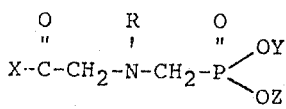

wherein:
R is selected from the group consisting of hydrogen, formyl, acetyl, benzoyl, nitrobenzoyl and chlorinated benzoyl;
Y and Z are each independently selected from the group consisting of hydrogen and lower alkyl;
X is selected from the group consisting of hydroxy, alkoxy and chloroalkoxy of up to 12 carbon atoms, lower alkenoxy, cyclohexyloxy, morpholino, pyrrolidinyl, piperidino and NHR'; and
R' is selected from the group consisting of hydrogen, lower alkyl and alkenyl, cyclohexyl, phenalkyl of up to 8 carbon atoms, phenyl, clorinated phenyl and anisyl;

and certain salts of these compounds, which salts are selected from the group consisting of the Group I and II metals having an atomic number up to 30, hydrochloride, pyridine, ammonium, lower aliphatic hydrocarbon amine, lower alkanol amine and aniline.

As employed herein, the term "lower" designates those aliphatic radicals which have up to 4 carbon atoms in a straight or branched chain. In the case of saturated chains, the group begins with methyl, while the unsaturated chain groups begin with vinyl and ethynyl. In addition, it will be recognized that the phenalkyl radicals disclosed herein are benzyl, α-methylbenzyl and phenethyl.

The salts which are encompassed by this invention can be mono, di or tri salts of the cations recited above, and, where the cation is a divalent metal, such salts include those formed with either one or two molecules of the parent acid. As regards the amine salts, it should be understood that these include the primary, secondary and tertiary amines of the defined aliphatic hydrocarbon and alkanol groups.

Compounds of the above formula, and their salts, can be readily prepared by the procedures described in detail in copending applications Ser. No. 123,057, filed Mar. 10, 1971, Ser. No. 168,388, filed Aug. 2, 1971, both now abandoned, and Ser. No. 170,385, filed Aug. 9, 1971, now U.S. Pat. No. 3,799,758.

Regulation of the natural growth or development of plants by chemical treatment may result from the effect of the chemical substance on the physiological processes of the plants, or it may be due to the effect of such substance on the morphology of the plant. As should be readily apparent, said regulation may also result from a combined or sequential effect of the chemical in the areas of both physiology and morphology.

In general, regulation of the natural growth or development which leads to a morphological change in the plant is readily noticeable by visual observation. Such changes can be found in the size, shape, color or texture of the treated plant or any of its parts. Similarly, changes in the quantity of plant fruit or flowers can be simply noted.

On the other hand, regulation which leads to changes in the physiological processes occur within the treated plant and are usually hidden from the eye of an observer. Changes of this type are most often in the production, location, storage or use of naturally occurring chemicals, including hormones, within the plant. Physiological changes in a plant may be recognized when followed by a subsequent change in morphology. Additionally, there are numerous analytical procedures known to those skilled in the art for determining the nature and magnitude of changes in the various physiological processes.

The individual compounds of the instant invention serve to regulate the natural growth or development of treated plants in a number of diverse ways, and it is to be understood that each compound may not produce identical regulatory effects on each plant species or at every rate of application. As stated above, responses will vary in accordance with the compound, the rate, the plant, etc.

Among the particular regulatory responses demonstrated by compounds of this invention is defoliation. It is recognized in the art that defoliation is not a herbicidal action, and, indeed, killing of the treated plant is undesirable since leaves will continue to adhere to a dead plant. Rather, it is necessary that the plant remain alive while the leaves separate and fall away. This permits further development of the productive plant parts, and leaf regrowth is preferably inhibited, whereby subsequent harvesting operations are facilitated. Defoliants are useful in crops such as flax, cotton, beans and the like.

Another regulatory response demonstrated by compounds of this invention can be generally termed retardation of vegetative growth, and such a response has a wide variety of beneficial features. In certain plants this retardation causes a diminution or elimination of the normal apical dominance leading to a shorter main stem and increased lateral branching. This alteration of the natural growth or development produces smaller, bushier plants which often demonstrate increased resistance to drought and pest infestation.

In the case of turf grasses retardation of vegetative growth is also highly desirable. When the vertical growth of such grasses is slowed, it is found that root development is enhanced to provide a dense, sturdier turf. Naturally, such retardation of turf grasses also serves to increase the interval between mowings of lawns, golf courses and similar grassy areas.

In many types of plants, such as silage crops, potatoes, sugar cane, beets, grapes, melons and fruit trees, the retardation of vegetative growth caused by compounds of this invention results in an increase in the carbohydrate content of the plants at harvest. It is believed that by retarding or suppressing such growth at the appropriate stage of development, less of the available carbohydrate is consumed as plant food with a consequent enhancement of the starch and/or sucrose content.

Also with fruit trees, such as in apple orchards, retardation of vegetative growth is demonstrated by shorter branches which lead to more fullness in shape and may also result in lesser vertical elongation. These factors contribute to the ease of access to the orchard and simplify the fruit harvesting procedure.

As illustrated in the examples which are hereinafter presented, the individual compounds of the invention regulate the natural growth or development of treated plants in numerous other and different respects. Included among these other regulatory effects are the instigation of axillary bud development, the alteration of leaf shape, the delay or acceleration of setting of fruit or pods, etc. Although regulatory effects such as those described above can be per se desirable, it is most often the ultimate result of these effects upon the economic factor which is of primary significance. Thus, it must be recognized that increases in the yield of individual plants, increases in the yield per unit area, and reductions in the cost of harvesting and/or subsequent processing are all to be considered in any assessment of the consequence of an individual regulatory effect during the growth or development of a plant.

The specific examples which follow are presented as merely illustrative, non-limiting demonstrations of the useful and unexpected regulating properties of various compounds of this invention.

EXAMPLE 1

In determining the regulatory effects of compounds of this invention on sugar cane, it should be noted that the appropriate rate of application can vary from about 0.1 lb. per acre to about 5.0 lbs. per acre. Depending upon local cultural practices, sugar cane is grown for from about 9 to about 30 months before harvest, and it is thus necessary to consider both the chronological age and the maturity stage of the cane in rate determinations. Application of the treatment to the cane is generally made from about 2 to 10 weeks prior to the scheduled harvest date.

In this test individual sugar cane stalks are treated with compounds of this invention about 4 weeks before harvest. To avoid sampling errors, older cane, preferably 13 to 23 months old, are employed in the tests. For each compound employed, at least five stalks are used, processed, and the total value obtained are averaged for each stalk. In order to improve the accuracy of the analyses, only the terminal 15 joints of each stalk are used. An identical number of untreated sugar cane stalks of the same age are similarly processed to provide a control. A comparison of the values obtained for the treated cane with the control sample provides a convenient means of determining the regulatory effectiveness of these compounds.

The analyses are carried out by the press method developed by T. Tanimoto and reported in Hawaiian Planters' Record, Volume 57, pp. 133–150. The data are expressed as Juice Purity and Pol percent Cane. Pol percent Cane is a polarimetric determination and equals the percentage of sucrose if it is the only substance in the solution which will rotate the plane of polarized light. A determination of Pol percent Cane is considered by those skilled in the art as an effective means of determining the sucrose content of sugar cane juice.

About 38 mg. of each compound employed is dissolved in a small amount of water which contains a small amount of a surface active agent. The resultant solution is then applied to the tip of each of the stalks to be tested with the exception of the untreated controls. After harvest, the top 15 joints of each stalk of a treated group are removed, combined and analyzed as described.

N-Phosphonomethylglycine (Cpd. A) was applied to sugar cane stalks in four tests at different times. The data obtained show increases in Juice Purity of from 4.9 to 20.6 percent and increases in Pol percent Cane of from 1.3 to 6.4. Such increases represent the arithmetic differences between the data for the treated and the untreated or control stalks. In three tests at different times, the mono-dimethylamine salts of N-phosphonomethylglycine (Cpd. B) shows increases in Juice Purity of from 3.6 to 17.3 percent and increases in Pol percent Cane of from 2.3 to 3.9.

At the same time as one of the tests on Cpd. A, the following eleven other compounds of this invention were tested in the manner described.

| | |
|---|---|
| monosodium salt of N-phosphonomethylglycine | (Cpd. C) |
| methyl N-phosphonomethylglycinate | (Cpd. D) |
| ethyl N-phosphonomethylglycinate | (Cpd. E) |
| 2-chloroethyl N-phosphonomethylglycinate | (Cpd. F) |
| n-propyl N-phosphonomethylglycinate | (Cpd. G) |
| n-butyl N-phosphonomethylglycinate | (Cpd. H) |
| n-hexyl N-phosphonomethylglycinate | (Cpd. I) |
| cyclohexyl N-phosphonomethylglycinate | (Cpd. J) |
| n-octyl N-phosphonomethylglycinate | (Cpd. K) |
| n-decyl N-phosphonomethylglycinate | (Cpd. L) |
| n-dodecyl N-phosphonomethylglycinate | (Cpd. M) |

The data obtained with these compounds show increases in Juice Purity of from 5.1 to 12.9 percent and increases in Pol percent Cane of from 1.8 to 5.3.

Another test was conducted in the above manner employing 13 additional compounds of this invention.

| | |
|---|---|
| dilithium salt of N-phosphonomethylglycine | (Cpd. N) |
| mono-methylamine salt of N-phosphonomethylglycine | (Cpd. O) |
| mono-diisopropylamine salt of N-phosphonomethylglycine | (Cpd. P) |
| mono-diethanolamine salt of N-phosphonomethylglycine | (Cpd. Q) |
| tetramethylene N-phosphonomethylglycinamide | (Cpd. R) |
| disodium salt of N-phosphonomethylglycine | (Cpd. S) |
| trisodium salt of N-phosphonomethylglycine | (Cpd. T) |
| monoammonium salt of N-phosphonomethylglycine | (Cpd. U) |
| calcium salt of N-phosphonomethylglycine | (Cpd. V) |
| monopotassium salt of N-phosphonomethylglycine | (Cpd. W) |
| hemimagnesium salt of N-phosphonomethylglycine | (Cpd. X) |
| hemicopper salt of N-phosphonomethylglycine | (Cpd. Y) |
| N-phosphonomethylglycinamide | (Cpd. Z) |

In this test it was found the Cpd. P, U and X produced a decrease in both Juice Purity and Pol percent Cane. However, similar tests in which the stalks were treated at a longer interval before harvesting demonstrated increases in both of the measured criteria as described below. With Cpd. O and S, a decrease was found in Juice Purity, but the Pol percent Cane showed an increase over the untreated control stalks.

The data obtained in this test show that the other eight of the compounds of this invention increased Juice Purity from 0.2 to 5.3 percent, and it further showed that the other 10 of said compounds of this invention increased Pol percent Cane from 0.3 to 2.1. In order to better appreciate the significance of a 0.3 increase in Pol percent Cane, it should be noted that the tests were conducted in a region when the average yield of cane is about 100 to 110 tons per acre, and about 10 tons of sugar is obtained from this quantity of cane. Based upon these figures, it is apparent that such a 0.3 increase becomes an additional 600 pounds of sugar per acre.

In still another test, the following 11 compounds of this invention were applied to sugar cane stalks in accordance with the recited procedures.

| | |
|---|---|
| mono-diethylamine salt of N-phosphonomethylglycine | (Cpd. AA) |
| monopyridine salt of N-phosphonomethylglycine | (Cpd. BB) |
| monoaniline salt of N-phosphonomethylglycine | (Cpd. CC) |
| N-phosphonomethylglycine hemihydrochloride hemihydrate | (Cpd. DD) |
| mono-dipropargylamine salt of N-phosphonomethylglycine | (Cpd. EE) |
| monosodium salt of ethyl N-phosphonomethylglycinate | (Cpd. FF) |
| mono-ethanolamine salt of N-phosphonomethylglycine | (Cpd. GG) |
| mono-diallylamine salt of N-phosphonomethylglycine | (Cpd. HH) |
| methyl N-acetyl-N-(diethoxyphosphinylmethyl) glycinate | (Cpd. II) |
| triethyl N-formyl-N-(phosphonomethyl) glycinate | (Cpd. JJ) |
| trimethyl N-formyl-N-(phosphonomethyl) glycinate | (Cpd. KK) |

In this test it was found that Cpd. II produced a decrease in Juice Purity, while Cpd. JJ produced a decrease in both criteria measured. As previously mentioned, similar tests of these compounds over a longer interval demonstrated increased values.

The data obtained in this test for the other nine compounds show increases in Juice Purity of from 0.2 to 10.5 percent, and it further showed increases in Pol percent Cane of from 0.5 to 3.8 for the other ten compounds.

The procedures described above were repeated at a different time employing Cpd. C, D, F, I, J and L. In this test Cpd. D and F gave a decrease in Juice Purity, although these same compounds demonstrated an increase over a longer interval. The other four compounds in this test increased Juice Purity from 2.4 to 11.4 percent, and all six of the compounds increased Pol percent Cane from 0.1 to 3.0.

EXAMPLE 2

Another regulatory effect of compounds of this invention was demonstrated in the following test on cotton. Cpd. B, identified above, was the particular chemical employed, and the plants treated were mature cotton of the Coker 413 variety having about 95 percent open bolls. The chemical, with a surfactant, was applied at two rates by means of a sprayer, and the observed results combine several replications.

At an application rate of 2.0 pounds per acre, Cpd. B showed no effect three days after treatment of the cotton plants. Observations at 14 and 33 days after treatment showed 55 percent and 83 percent defoliation or leaf drop. Using the same chemical at 4.0 pounds per acre, 5 percent defoliation or leaf drop was noted after 3 days, and the leaves were showing a cupped effect. The figures for the later observations were 88 percent and 100 percent, respectively. No regrowth was noted in any of the observations of the cotton plants treated at either rate, and no defoliation or leaf drop was noted in the untreated control area.

As a part of the above-described test, cotton was also treated with a combination of two commercial defoliants at about their normal use rate. Observations showed 58 percent defoliation or leaf drop after 3 days, far higher than with Cpd. B, and figures about equal to the 4.0 pound treatment with Cpd. B at the two later dates. However, the cotton plants treated with said combination were found to have 67 percent and 73 percent of regrowth or new leaf growth at such later dates.

EXAMPLE 3

The regulatory effect of compounds of this invention on table beets was demonstrated in the following test. Cpd. A, identified above, was the particular chemical employed, and treatment was made to beets of the Early Wonder variety which had been grown for 50 days. The chemical was formulated in acetone and water, and about 0.05 percent of a surface active agent was used.

Applications were made at rates of 1.0, 0.5 and 0.25 mg. per plant using a hand sprayer, and roots were harvested at 2 and 4 weeks after the treatment. Sucrose and total carbohydrate content were determined using the anthrone method with juice expressed from borings taken from the roots. Data was also obtained on untreated plants and on plants treated with only the solvent and surfactant. The observed results combine several replications of each test.

Data obtained 2 weeks after treatment show that the beets treated with only solvent and surfactant contained 11 percent more sucrose than the untreated beets, while beets treated at the various rates of Cpd. A indicated show sucrose increases of from about 15 to 32 percent over said untreated beets. Further, the treated beets at 2 weeks showed from about 4 to about 18 percent more sucrose than those treated without Cpd. A.

Determinations of total carbohydrate content 2 weeks after treatment again showed that all of the treated plants displayed at least a 10 percent increase over the untreated beets. It is to be noted, however, that beets treated with Cpd. A at the lowest rate, 0.25 mg. per plant, were found to contain less total carbohydrates than those treated only with solvent and surfactant.

When data was obtained 4 weeks after application, it was found that the highest content of both sucrose and total carbohydrates was in the untreated table beets. These latter results serve to illustrate that certain regulatory effects of compounds of this invention may be temporary or transient.

EXAMPLE 4

In this test certain compounds of the invention were employed to demonstrate a regulatory effect on the vegetative growth of turf grasses. A number of pots were planted with either K-31 fescue or Merion bluegrass and were grown for about 4 weeks. The compounds to be applied were formulated in acetone and water, and about 0.5 percent of a surface active agent was added. Treatments at the rates indicated were made with a hand sprayer, and observations were made 2 weeks later. The observed results combine several replications of each test, and they are based upon comparison measurements against an untreated control.

When ethyl N-(dimethoxyphosphinylmethyl) glycinate (Cpd. LL) or N'-allyl-N-phosphonomethylglycinamide (Cpd. MM) are applied at rates of about 5.0 and 2.5 pounds per acre, the vegetative growth or height of the fescue was found to be at least 25 percent less than the untreated control. Each of these compounds produced slight phytotoxicity on bluegrass at the 5.0 pounds rate. Cpd. A, at 0.5 pounds per acre, also gave the above-noted results on fescue and bluegrass.

When mono-ethylamine salt of N-phosphonomethylglycine (Cpd. NN) or mono-butylamine salt of N-phosphonomethylglycine (Cpd. OO) are applied at rates of about 0.5 and 0.25 pounds per acre, the vegetative growth or height of the fescue was found to be at least 25 percent less than the untreated control, and it was also noted that the bluegrass was killed at the higher rate. The mono-isobutylamine salt of N-phosphonomethylglycine (Cpd. PP) produced the above-noted retardation of vegetative growth of the fescue at 1.0 and 0.5 pounds rates, but it was not tested on bluegrass. The N'-p-anisyl-N-phosphonomethylglycinamide (Cpd. QQ) showed no effect on fescue at 5.0 pounds per acre, while retarding the vegetative growth or height of bluegrass by at least 25 percent at that rate.

Using Cpd. Z at a 5.0 rate and Cpd. FF at a 1.0 rate, moderate phytotoxicity was noted on the fescue, and slight phytotoxicity on the fescue was noted with Cpd. V at a 5.0 pounds rate. However, by reducing these rates to 2.5 pounds for Cpd. V, 1.0 pounds for Cpd. Z and 0.5 pounds for Cpd. FF, phytotoxicity was eliminated and the vegetative growth or height of the fescue was at least 25 percent less than the untreated control. The higher rate of Cpd. V and FF, and Cpd. Z at a 2.5 pounds rate, killed the bluegrass.

When N'-(3,4-dichlorophenyl)-N-phosphonomethylglycinamide (Cpd. RR) was applied to fescue at rates of 5.0, 2.5 and 1.0 pounds per acre, a retardation of vegetative growth or height of at least 25 percent was noted. This compound had no effect on bluegrass at the highest rate.

As noted heretofore, and as further illustrated in this example, specific individual compounds of this invention produce varying responses in different plants, and both the magnitude and nature of such responses will also depend upon application rate, stage of plant development, environment conditions and the like.

EXAMPLE 5

Another facet of the regulatory effect of compounds of this invention was demonstrated in the following test on apple trees. Cpd. B was the particular chemical employed, and treatment was made to McIntosh apple trees in an orchard. Flowering was essentially complete and leaves were out at the time of treatment.

The chemical was formulated in water, and 0.05 percent of surfactant was added. Four branches on each tree in the test were selected, and branch length was measured from a fork which was marked. Application was made to the measured branches at rates equivalent to 0.5, 0.25, 0.125 and 0.0625 pounds per acre. Branches of at least two trees were treated at each rate, different trees being used for each rate, and three untreated trees had branches measured and marked as controls.

About 5 weeks after the application date, all treated and control branches were again measured. In the case of three individual branches the later measurement was found to be shorter. Error in initial measurements was assumed, and data on these three branches were omitted in calculations of average branch growth. It was found that the average growth of the untreated control branches was 13 cm. As opposed to this figure, the average branch growth at the 0.0625 rate was 11.8 cm., a retardation of vegetative growth of over 9 percent, and the average branch growth at the 0.5 rate was only 7.8 cm., a retardation of vegetative growth of 40 percent.

At the time of the second measurements it was also noted that fruit was present on at least some of the branches at each test rate and on some of the untreated branches.

EXAMPLE 6

In conjunction with the tests described in Example 1, the recited number of additional stalks of sugar cane were treated with the compounds of this invention, but these additional stalks were not harvested until about 5 weeks after treatment. Untreated control stalks were also harvested at the same time, and all stalks processed and analyzed in manner set forth in said Example 1.

One of the four tests with Cpd. A showed decreases in both measured criteria, while the other three tests showed increases in Juice Purity of from 9.0 to 14.0 percent and increases in Pol percent Cane of from 4.0 to 5.9. In the three tests with Cpd. B, the data obtained show that Juice Purity was increased from 8.4 to 10.9 percent, and Pol percent Cane was increased from 3.6 to 5.6. Here, as in Example 1, the recited increases represent arithmetic difference between the data for the treated stalks and the data for the untreated control stalks.

In the tests conducted with each of Cpd. C through M, the data obtained show increases in Juice Purity of from 2.2 to 10.6 percent and increases in Pol percent Cane of from 2.0 to 5.5. When the stalks were treated with each of Cpd. N through Z, a decrease in Juice Purity was noted with Cpd. M, while the other 12 compounds of this invention gave increases of from 6.3 to 14.8 percent. All of these compounds increased Pol percent Cane, such increases being from 0.1 to 4.7.

Using each of Cpd. AA through KK, the data obtained show Juice Purity increases of from 2.8 to 14.5 percent, while increases in Pol percent Cane were from 1.2 to 6.9. In the second test run with each of Cpd. C, D, F, I, J and L, Juice Purity was increased from 7.0 to 14.1 percent and Pol percent Cane was increased from 2.0 to 4.8.

EXAMPLE 7

In these tests the regulatory effects of a compound of this invention was demonstrated on a representative cereal grain.

A number of wheat plants of the Waldron variety are grown from seeds in an aluminum pan for a period of 1 week. The height of each wheat plant is then measured to the top of the whorl. A 1 percent solution of Cpd. A in acetone is prepared, and a 2.0 ml. portion of said solution is mixed with 0.8 ml. of acetone and 2.8 ml. of a water mixture with 0.05 percent of Aerosol OT. The resultant solution is then sprayed over the plants in the pan at an application rate equivalent to about 5.0 lbs./acre. A control pan, planted at the same time as the test pan, also has its plants measured, but receives no chemical application. The pans are transferred to a greenhouse and watered from below in a sand bench. Each pan is fertilized with 40 ml. of a 1.5 percent solution of Rapid-Gro about 2 days after treatment.

Two weeks after treatment the height of each plant in the pans is again measured to the top of the whorl. After determining the average height increase of the plants in the untreated control pan, it is found that at least two-thirds of the wheat plants treated with the test compound of this invention show 26 percent or more reduction of vegetative growth by direct comparison. Some slight phytotoxicity is noted on the treated plants.

In subsequent tests using the same compound, a number of wheat plants of the above-named variety are planted in pots and grown to the fourth leaf stage. The height of each plant is measured to the top of the whorl, and solutions of Cpd. A at various rates are sprayed over the plants which, along with untreated controls, are then handled in the manner described. Measurements and comparisons with the control are made 2 weeks after application.

The wheat plants treated at rates of 5.0, 2.5, 1.0 and 0.5 lbs./acre all show a reduction of vegetative growth of at least 26 percent. Although the plants treated at the two higher application rate show phytotoxicity, this effect is not found on plants treated at either 1.0 or 0.5 lbs./acre. In addition, it is noted that flowering is delayed at these lower rates.

EXAMPLE 8

The regulatory effects of compounds of this invention were demonstrated in a series of tests on representative mono and dicotyledonous crop plants. In each of these tests the compounds were formulated in acetone and/or water plus a small amount of a surface active agent, and the specific application rates were varied depending upon the particular compound and the particular test. The representative moncot crop plants were corn of the XL-45 or Pioneer 3567 varieties, and the representative dicot crop plants were soybeans of the Wayne or Corsoy varieties. Untreated control plants were employed for comparison in all tests. The procedures used were as follows:

TEST A

A number of corn plants are grown from seeds in an aluminum pan for a period of 1 week. The height of each corn plant is then measured to the top of the whorl. A solution of the compound being tested is then sprayed over the plants in a pan at a selected application rate. All pans are transferred to a greenhouse and watered from below in a sand bench. Each pan is fertilized with 40 ml. of a 1.5 percent solution of Rapid-Gro about 2 days after treatment. Two weeks after treatment the height of each plant in the pans is again measured to the top of the whorl, and direct comparisons are made with the untreated control plants.

TEST B

A number of soybean plants are grown from seeds in an aluminum pan for a period of 1 week. The height of each soybean plant is then measured to the top of the terminal bud. A solution of the compound being tested is then sprayed over the plants at a selected application rate and pans are thereafter handled as described in said Test A. Two weeks after treatment the height of each plant in the pans is again measured to the top of the terminal bud, and direct comparisons are made with the untreated control plants.

TEST C

Corn plants are grown from seeds in individual plastic pots. After 4 weeks of growth, a number of pots having the same size plants are sprayed with a solution of the compound being tested at a selected application rate, transferred to a greenhouse, and watered and fertilized substantially as set forth above. The plants serving as the untreated controls are of approximately the same size as the treated plants at the time of application. Three weeks after treatment the height of each corn plant is measured to the base of the flag leaf, other visible effects are noted, and direct comparisons are made with the untreated control plants.

TEST D

A number of soybean plants are grown from seeds in plastic pots, and these are thinned to a single plant per pot just prior to treatment. A solution of the compound being tested is sprayed on plants in several pots, such plants including some that are 4 weeks old (3-4 trifoliate stage) and some that are 6 weeks old (5-6 trifoliate stage). The treated plants and those in the untreated controls are of approximately the same size at the time of application, and thereafter, all plants are transferred to a greenhouse, and watered and fertilized substantially as set forth above. Two weeks after application the height of each soybean plant is measured to the tip of the terminal bud, other visible effects are noted, and direct comparisons are made with the untreated control plants. Except where specifically noted, the results of tests on the two trifoliate stages are combined and averaged.

In connection with specific application rates used in Tests A–D in terms of lbs./acre, it should be pointed out that such tests involve treatment of a relatively small number of plants in a pan or pot. Thus, the actual rate of application of the chemical to the plants themselves may be generally somewhat lower than the stated lbs./acre.

At an application rate of about 6.0 lbs./acre in Test A with either the monosodium salt of N-benzoyl-N-phosphonomethylglycine (Cpd. SS) or N'-M-anisyl-N-phosphonomethylglycinamide (Cpd. TT), it is found that at least two-thirds of the treated corn plants show 26 percent or more reduction or retardation of vegetative growth as against the untreated controls. The same regulatory effect is demonstrated at that rate with pentamethylene N-phosphonomethylglycinamide (Cpd. UU), although no effect is noted at 3.0 lbs./acre. Both Cpd. TT and UU cause some chlorosis at the 6.0 lbs. rate.

At an application rate of about 3.0 lbs./acre in Test A with any of allyl N-phosphonomethylglycinate (Cpd. VV), the zinc salt of N-phosphonomethylglycine (Cpd. WW), Cpd. M or Cpd. AA, it is found that at least two-thirds of the treated corn plants show 26 percent or more retardation of vegetative growth as against the untreated controls. Some necrosis is noted with Cpd. VV, and some chlorosis is noted with each of the other three compounds. Using either Cpd. K or Cpd. L in Test A at a 6.0 lbs. rate, the same retardation is shown, some chlorosis being noted with the former compound.

No effects are noted in Test C with Cpd. K or Cpd. L at about 1.12 lbs./acre. However, Cpd. WW at 0.6 lbs./acre in this test produces a retardation in the total height of the treated plants of at least 15 percent as against the untreated controls.

At an application rate of about 6.0 lbs./acre in Test A with any of the magnesium salt of N-phosphonomethylglycine (Cpd. XX) and Cpd. B, V, W, X or Y, it is found that at least two-thirds of the treated corn plants show 26 percent or more reduction or retardation of vegetative growth as against the untreated controls. With Cpd. V and XX, it is also noted that there was some chlorosis and necrosis. Using each of these six compounds in Test C at about 8.33 lbs./acre, a retardation of vegetative growth of at least 15 percent is shown for Cpd. B, W, X and XX, and, at this rate such compounds, plus Cpd. Y, show some phytotoxic effect on the treated plants. Cpd. V is ineffective in Test C at this rate. In addition, it is observed that Cpd. W and Y delay earshoot emergence. Cpd. W also causes a poorly developed tassel, while the absence of pollen is noted with Cpd. Y.

When any of N'-m-chlorophenyl-N-phosphonomethylglycinamide (Cpd. YY), the monosodium salt of N-p-nitrobenzoyl-N-phosphonomethylglycine (Cpd. ZZ), and Cpd. G, K or L are used at an application rate of 6.0 lbs./acre in Test B, it is found that at least two-thirds of the treated soybean plants show 26 percent or more reduction or retardation of vegetative growth as against the untreated controls. Some chlorosis is noted with Cpd. G, K and L, while Cpd. K, L and ZZ show leaf alteration, and axillary bud development is observed with Cpd. G, K and L.

The same five compounds of this invention are applied in Test D at 5.0 lbs./acre, and it is found that all except Cpd. ZZ show some phytotoxicity. Cpd. G, K, L and ZZ each inhibit pod set, and the first three of these also delay pod set and show some chlorsis. Using Cpd. L in Test D at a lower rate of 2.5 lbs./acre, no phytotoxicity is noted and pod set is enhanced.

In Test B at 6.0 lbs./acre, N-phosphonomethylglycine morpholide (Cpd. AAA) shows some chlorosis, and leaf alteration is observed. With Cpd. VV at 3.0 lbs./acre in the same test, it is found that at least two-thirds of the soybean plants show 26 percent or more retardation of vegetative growth as against the untreated controls. It is also noted that both apical development and axillary buds are inhibited.

At an appliation rate of 6.0 lbs./acre in Test A with any of Cpd. E, F, O, P, Q, NN, OO or PP, and at an application rate of 3.0 lbs./acre in the same test with any of these compounds or Cpd. FF, some phytotoxic effect is noted on the treated corn plants. When said rate is lowered to about 1.2 lbs./acre, some phytotoxic effect is still noted with Cpd. E, P, Q and OO. No phytotoxicity is observed with Cpd. F, O, FF, NN and PP at the 1.2 lbs. rate, and it is found that at least two-thirds of the treated corn plants show 26 percent or more retardation of vegetative growth as against the untreated controls. Some necrosis or chlorosis is noted with Cpd. F, O and FF. With the rate further lowered to 0.6 lbs./acre, no phytotoxicity is shown with Cpd. E, P, Q and OO, and reduction of vegetative growth, with some necrosis or chlorosis, is found as noted above.

When any of the mono-isopropylamine salt of N-phosphonomethylglycine (Cpd. BBB) and Cpd. NN, OO or PP are employed in Test B at rates of 6.0 and 3.0 lbs./acre, some phytotoxic effect is noted on the treated plants, and such an effect is also noted with either Cpd. OO or BBB at about 1.2 lbs./acre. However, with both Cpd. NN and PP at the last-named rate, it is found that at least two-thirds of the treated soybean plants show 26 percent or more retardation or reduction of vegetative growth as against the untreated controls with no phytotoxicity. Some chlorosis is observed, along with axillary bud development and leaf inhibition. Lowering the application rate of Cpd. OO and BBB to 0.6 lbs./acre also eliminates the phytotoxicity, and the abovenoted degree of vegetative growth retardation is found with the former. Leaf alteration is noted with both compounds at this rate, and axillary bud development is observed with Cpd. OO.

At application rates of both 6.0 and 3.0 lbs./acre in Test B, some phytotoxicity is noted with any of Cpd. E, F, I, O, P or Q. By lowering the rate to 11.2 lbs./acre with each compound, it is found that the phytotoxic effect is eliminated, and, except for Cpd. I, at least two-thirds of the treated soybean plants show 26 percent or more retardation of vegetative growth as against the untreated control. Such retardation is also found with either Cpd. E or Q at 0.6 lbs./acre. Some chlorosis and leaf inhibition is observed with Cpd. E and F, and all of these compounds further show axillary bud development and/or leaf alteration at the 1.2 lbs. rate.

With each of Cpd. E, F and I, slight phytotoxicity is noted at 1.0 lbs./acre in Test D, along with some inhibition of pod set. In the same test at the same rate, there is no phytotoxicity with any of Cpd. O, P and Q, and the latter shows an average reduction or retardation of vegetative growth of at least 15 percent in the treated soybean plants as against the untreated controls. Each of Cpd. O, P and Q show leaf alteration and axillary bud development at this rate. In addition, Cpd. O also enhances pod set, and Cpd. Q also alters the canopy. At a rate of 0.5 lbs./acre, Cpd. Q is observed to produce early pod set and leaf alteration.

Using a rate of 0.5 lbs./acre is Test D with any of Cpd. E, F or I, it is found that the treated plants show an average retardation of vegetative growth of at least 15 percent as against the untreated controls. With Cpd. E at this rate, some chlorosis, axillary bud development and inhibition of apical development are noted, while axillary bud development, and leaf and canopy alteration are observed with Cpd. I. In the case of Cpd. F, leaf alteration, a dark foliar color and enhanced pod set are found.

When Cpd. N is applied at rates of 6.0 and 3.0 lbs./acre in Test A, it is found that at least two-thirds of the treated corn plants show 26 percent or more reduction or retardation of vegetative growth as against the untreated controls. Some phytotoxicity is noted at the higher rate but is not observed when said rate is lowered. The same compound is also found to be phytotoxic at about 0.6 lbs./acre in Test C, but this effect is not present at a rate of about 0.25 lbs./acre, and the treated plants in the latter instance show an average retardation of vegetative growth of at least 15 percent as against the untreated controls.

At an application rate of 3.0 lbs./acre in Test B, some phytotoxicity is noted with either Cpd. BB or FF, while each of Cpd. AA, CC, EE and HH is found to show a retardation of vegetative growth of 26 percent or more on at least two-thirds of the treated soybean plants as against the untreated controls. Some chlorosis is observed with each of these compounds, along with axillary bud development, leaf alteration and/or inhibition. With the rate at 1.2 lbs./acre in the same test employing each of Cpd. BB, CC, FF and HH, no phytotoxicity is observed, and it is found that both Cpd. CC and FF show the above noted retardation of vegetative growth. Axillary bud development is noted with all four compounds at this rate.

Turning to Test D, some phytotoxicity and inhibited pod set are noted for each of Cpd. CC, EE and HH at 2.5 lbs./acre. Phytotoxicity is also noted at 1.0 lbs./acre with each of CP. AA, BB, CC and FF, while none is found with Cpd. HH at this rate. Delayed or inhibited pod set and/or leaf alteration are observed with all but Cpd. BB. With the application rate further lowered to about 0.5 lbs./acre with each of Cpd. AA, BB, CC and FF, the treated soybean plants show an average reduction or retardation of vegetative growth of at least 15 percent as against the untreated controls, and leaf alteration is noted in each case.

When any of Cpd. B, V, X or XX is used in Test B at about 6.0 lbs./acre, it is found that at least two-thirds of the treated soybean plants show 26 percent or more retardation of vegetative growth as against the untreated controls. Some chlorosis, inhibition of apical development and axillary bud development is noted with Cpd. X. With the same four compounds of this invention in Test D at 5.0 lbs./acre, the soybean plants treated at the 5–6 trifoliate stage show an average retardation of vegetative growth of at least 15 percent, and leaf alteration is also observed with Cpd. B and X. The same degree of retardation is found in the 3–4 trifoliate stage with Cpd. V, X and XX, with Cpd. X further showing some phytotoxicity at this rate. At a 2.5 lbs./acre rate of Cpd. X, the retardation effect is again demonstrated in the 3–4 trifoliate stage with no phytotoxicity. Canopy alteration is noted in this stage at both the 5.0 and 2.5 lbs. rates.

At application rates of 6.0 and 3.0 lbs./acre of Cpd. C in Test B, some phytotoxic effect is observed. At 1.2 lbs./acre in the same test, it is found that at least two-thirds of the treated plants show 26 percent or more reduction or retardation of vegetative growth as against the untreated controls, and axillary bud development is noted. With Cpd. C in Test D at rates of 2.5 and 1.0 lbs./acre, treated plants at both stages show an average retardation of vegetative growth of at least 15 percent. A phytotoxic effect is observed at the higher rate but not at the lower. The 1.0 lbs./acre rate also produces early pod set in the 5–6 trifoliate stage plants.

Using Cpd. GG at 6.0 and 3.0 lbs./acre in Test A gives a phytotoxic effect. This effect does not appear when the rate is lowered to 1.2 lbs., and it is found that at least two-thirds of the treated corn plants show 26 percent or more retardation of vegetative growth as against the untreated controls. Some phytotoxic effect is also observed at 1.6 lbs./acre in Test C, along with an average retardation of vegetative growth of at least 15 percent in the treated plants. It is further noted that pollen is absent.

Using Cpd. W at 5.0 and 2.5 lbs./acre in Test D, an average retardation of vegetative growth of at least 15 percent is noted in the soybean plants treated at both stages. Phytotoxicity is noted at the higher rate but not at the lower. The lower rate demonstrates some chlorosis at both stages and delays pod set in the earlier stage.

Using Cpd. Y in Test B at 6.0 lbs./acre, both axillary bud development and leaf alteration are observed. At a 5.0 lbs. rate in Test D, some phytotoxicity and an average retardation of vegetative growth of at least 15 percent are noted. The phytotoxic effect is eliminated at 2.5 lbs./acre, and the above-noted retardation is found in the 3–4 trifoliate stage plants. Delayed pod set and altered canopy are also observed.

At application rates of 2.5 and 1.0 lbs./acre with Cpd. N in Test D, an average retardation of vegetative growth of at least 15% is noted in the treated soybean plants at the 3–4 trifoliate stage. Phytotoxicity is observed at the higher rate but not at the lower. These effects are not found in the plants treated at the other stage. The 3–4 trifoliate stage soybean plants also show some chlorosis, axillary bud development and canopy alteration at 2.5 lbs., while both leaf and canopy alteration is observed at 1.0 lbs./acre.

At application rates of 2.5 and 1.0 lbs./acre with Cpd. D in Test D, an average retardation of vegetative growth of at least 15 percent is noted in the treated soybean plants at the 5–6 trifoliate stage. The same effect is noted on the 3–4 trifoliate stage plants, with slight phytotoxicity, at the 2.5 lbs. rate, but not at the lower rate. The 5–6 trifoliate plants show leaf alteration at 1.0 lbs./acre, and some chlorosis, delayed pod set and axillary bud inhibition are noted at the higher rate.

Using Cpd. A at 5.0 lbs./acre in both Tests A and C, it is found that at least two-thirds of the treated corn and soybean plants show 26 percent or more reduction or retardation of vegetative growth as against the untreated controls. Similar retardation of vegetative growth is also observed with this compound at various rates in Tests B and D, and some phytotoxicity is noted in these latter tests.

At application rates of 6.0 and 3.0 lbs./acre with Cpd. U in Test B, a phytotoxic effect is observed. This effect is eliminated when the rate is lowered to 1.2 and 0.6 lbs./acre, and it is found that at least two-thirds of the treated soybean plants show 26 percent or more retardation of vegetative growth as against the untreated controls. Some leaf alteration is observed at the 1.2 lbs. rate. Using the same Cpd. U in Test D at rates of 1.0 and 0.5 lbs./acre, no effects are found with the higher rate on the 5–6 trifoliate stage, or with the lower rate on the 3–4 trifoliate stage. In each stage plants, at the other test rate, an average retardation of vegetative growth of at least 15 percent is noted as against the untreated controls. Canopy alteration is also found in the latter tests, along with leaf distortion at the 5–6 trifoliate stage and delayed pod set at the 3–4 trifoliate stage.

From the illustrative data presented in the foregoing examples of individual compounds of this invention on a variety of representative plants, it should be clear that regulatory response will be dependent upon the compound employed, the rate of application, the plant specie and its stage of development, and other factors well understood by those skilled in the art.

The plant regulating compositions, including concentrates which require dilution prior to application to the plants, of this invention contain at least one active ingredient and an adjuvant in liquid or solid form. The compositions are prepared by admixing the active ingredient with an adjuvant including diluents, extenders, carriers and conditioning agents to provide compositions in the form of finely divided particulate solids, pellets, solutions, dispersions or emulsions. Thus the active ingredient can be used with an adjuvant such as a finely divided solid, a liquid of organic origin, water, a wetting agent, a dispersing agent, an emulsifying agent or any suitable combination of these. From the viewpoint of economy and convenience, water is the preferred diluent, particularly with the highly water-soluble glycine salts such as the alkali metal salts and amine and ammonium salts. With these derivatives, solutions containing as high as 5 pounds or more of active materials per gallon can be readily prepared.

The plant regulating compositions of this invention, particularly liquids and soluble powders, preferably contain as a conditioning agent one or more surface-active agents in amounts sufficient to render a given composition readily dispersible in water or in oil. The incorporation of a surface-active agent into the compositions greatly enhances their efficacy. By the term "surface-active agent" it is understood that wetting agents, dispersing agents, suspending agents and emulsifying agents are included therein. Anionic, cationic and non-ionic agents can be used with equal facility.

Preferred wetting agents are alkyl benzene and alkyl naphthalene sulfonates, sulfated fatty alcohols, amines or acid amides, long chain acid esters of sodium isothionate, esters of sodium sulfosuccinate, sulfated or sulfonated fatty acid esters petroleum sulfonates, sulfonated vegetable oils, ditertiary acetylenic glycols, polyoxyethylene derivatives of alkylphenols (particularly isooctylphenol and nonylphenol) and polyoxyethylene derivatives of the mono-higher fatty acid esters of hexitol anhydrides (e.g., sorbitan). Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium N-methyl-N-(long chain acid) laurates.

Water-dispersible powder compositions can be made containing one or more active ingredients, an inert solid extender and one or more wetting and dispersing agents. The inert solid extenders are usually of mineral origin such as the natural clays, diatomaceous earth and synthetic minerals derived from silica and the like. Examples of such extenders include kaolinites, attapulgite clay and synthetic magnesium silicate. The water-dispersible powder of this invention usually contain from about 5 to about 95 parts by weight of active ingredient, from about 0.25 to 25 parts by weight of wetting agent, from about 0.25 to 25 parts by weight of dispersant and from 4.5 to about 94.5 parts by weight of inert solid extender, all parts being by weight of the total composition. Where required, from about 0.1 to 2.0 parts by weight of the solid inert extender can be replaced by a corrosion inhibitor or anti-foaming agent or both.

Aqueous suspensions can be prepared by mixing together and grinding an aqueous slurry of water-insoluble active ingredient in the presence of dispersing agents to obtain a concentrated slurry of very finely divided particles. The resulting concentrated aqueous suspension is characterized by its extremely small particle size, so that when diluted and sprayed, coverage is very uniform.

Emulsifiable oils are usually solutions of active ingredient in water-immiscible or partially water-immiscible solvents together with a surface active agent. Suitable solvents for the active ingredient of this invention include hydrocarbons and water-immiscible ethers, esters or ketones. The emulsifiable oil compositions generally contain from about 5 to 95 parts active ingredient, about 1 to 50 parts surface active agent and about 4 to 94 parts solvent, all parts being by weight based on the total weight of emulsifiable oil.

When operating in accordance with the present invention, effective plant regulating amounts of the glycines are applied directly or indirectly to the plants. The application of liquid and particulate solid regulating compositions can be carried out by conventional methods, e.g., power dusters, boom and hand sprayers and spray dusters. The compositions can also be applied from airplanes as a dust or a spray because of their effectiveness at low dosages.

The application of an effective plant regulating amount of the compounds of this invention to the plant is essential and critical for the practice of the present invention. The exact amount of active ingredient to be employed is dependent upon the response desired in the plant as well as such other factors as the plant species and stage of development thereof, and the environmental conditions, as well as the specific glycine employed. In general, the active ingredients are employed in effective plant regulating amounts equivalent to from about 0.01 to about 10.0 lbs./acre. It should be understood that the amount of active ingredient employed must be sufficient to regulate the natural growth or development of the treated plants without producing a herbicidal or killing effect on such plants. It is believed that those skilled in the art can readily determine from the teachings of this specification, including examples, the appropriate application rates.

Although the invention is described with respect to specific modifications, the details thereof are not to be construed as limitations except to the extent indicated in the following claims.

What is claimed is:

1. A method of regulating the natural growth and development of plants which comprises applying to said plants an effective, plant-regulating, non-lethal amount of a compound selected from those having the formula $$X-\overset{O}{\underset{\|}{C}}-CH_2-\overset{R}{\underset{|}{N}}-CH_2-\overset{O}{\underset{\|}{P}}\overset{OY}{\diagdown OZ}$$

wherein:
R is selected from the group consisting of hydrogen, formyl, acetyl, benzoyl, nitrobenzoyl and chlorinated benzoyl;
Y and Z are each independently selected from the group consisting of hydrogen and lower alkyl;
X is selected from the group consisting of hydroxy, alkoxy and chloroalkoxy of up to 12 carbon atoms, lower alkenoxy and cyclohexyloxy;
and certain salts thereof, which salts are selected from the group consisting of the Group I and II metals having an atomic number up to 30, hydrochloride, pyridine, ammonium, lower aliphatic hydrocarbon amine, lower alkanol amine and aniline.

2. A method as defined in claim 1 wherein said compound is a salt.

3. A method as defined in claim 2 wherein said salt is selected from Group I and Group II metals having an atomic number up to 30.

4. A method as defined as claim 2 wherein said salt is a lower aliphatic hydrocarbon amine salt.

5. A method as defined in claim 1 wherein R is hydrogen.

6. A method as defined in claim 5 wherein Y and Z are hydrogen.

7. A method as defined in claim 6 wherein X is alkoxy of up to 12 carbon atoms.

8. A method as defined in claim 1 wherein the compound is N-phosphonomethylglycine.

9. A method as defined in claim 1 wherein the compound is n-butyl N-phosphonomethylglycinate.

10. A method as defined in claim 1 wherein the compound is the monosodium salt of N-phosphonomethylglycine.

11. A method as defined in claim 1 wherein the compound is the mono-dimethylamine salt of N-phosphonomethylglycine.

12. A method as defined in claim 1 wherein the compound is the mono-butylamine salt of N-phosphonomethylglycine.

13. A method as defined in claim 1 wherein the compound is the mono-isobutylamine salt of N-phosphonomethylglycine.

14. A method as defined in claim 1 wherein the compound is ethyl N-(dimethoxyphosphinylmethyl) glycinate.

15. A method as defined in claim 1 wherein the compound is the monosodium salt of ethyl N-phosphonomethylglycinate.

16. A method of retarding the vegetative growth of plants which comprises applying to said plants an effective, vegetative growth retarding, non-lethal amount of a compound selected from those having the formula $$X-\overset{O}{\underset{\|}{C}}-CH_2-\overset{R}{\underset{|}{N}}-CH_2-\overset{O}{\underset{\|}{P}}\overset{OY}{\diagdown OZ}$$

wherein:
R is selected forrm the group consisting of hydrogen, formyl, acetyl, benzoyl, nitrobenzoyl and chlorinated benzoyl;
Y and Z are each independently selected from the group consisting of hydrogen and lower alkyl;
X is selected from the group consisting of hydroxy, alkoxy and chloroalkoxy of up to 12 carbon atoms, lower alkenoxy and cyclohexyloxy
and certain salts thereof, which salts are selected from the group consisting of the Group I and II metals having an atomic number up to 30, hydrochloride, pyridine, ammonium, lower aliphatic hydrocarbon amine, lower aklanol amine and aniline.

17. A method as defined in claim 16 wherein said compound is a salt.

18. A method as defined in claim 17 wherein said salt is selescted from Group I and Group II metals having an atomic number up to 30.

19. A method as defined in claim 17 wherein said salt is a lower aliphatic hydrocarbon amine salt.

20. A method as defined in claim 16 wherein R is hydrogen.

21. A method as defined in claim 20 wherein Y and Z are hydrogen.

22. A method as defined in claim 21 wherein X is alkoxy of up to 12 carbon atoms.

23. A method as defined in claim 16 wherein the compound is N-phosphonomethylglycine.

24. A method as defined in claim 16 wherein the compound is n-butyl N-phosphonomethylglycinate.

25. A method as defined in claim 16 wherein the compound is the monosodium salt of N-phosphonomethylglycine.

26. A method as defined in claim 16 wherein the compound is the mono-dimethylamine salt of N-phosphonomethylglycine.

27. A method as defined in claim 16 wherein the compound is the mono-butylamine salt of N-phosphonomethylglycine.

28. A method as defined in claim 16 wherein the compound is the mono-isobutylamine salt of N-phosphonomethylglycine.

29. A method as defined in claim 16 wherein the compound is ethyl N-(dimethoxyphosphinylmethyl) glycinate.

30. A method as defined in claim 16 wherein the compound is the monosodium salt of ethyl N-phosphonomethylglycinate.

31. A method as defined in claim 16 wehrein the plants are turf grasses.

32. A method as defined in claim 16 wherein the plants are monocotyledonous crop plants.

33. A method as defined in claim 16 wherein the plants are dicotyledonous crop plants.

34. A method as defined in claim 16 wherein the plants are sugar cane.

35. A method as defined in claim 1 wherein the compound is the mono-isopropylamine salt of N-phosphonomethylglycine.

* * * * *